Patented July 1, 1930

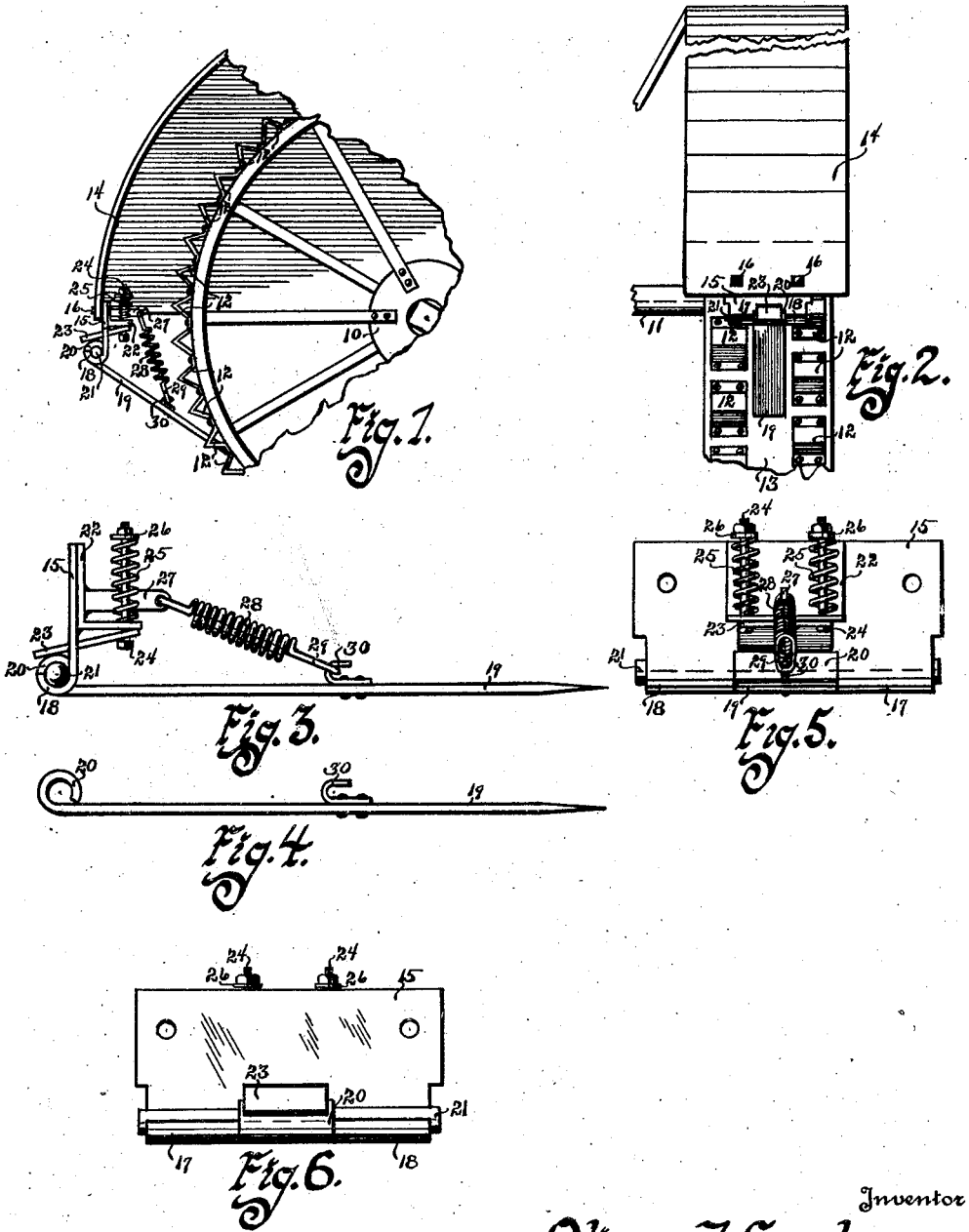

1,769,419

UNITED STATES PATENT OFFICE

OLIVER T. CROAT, OF ST. MARYS, IOWA

SCRAPER FOR TRACTION WHEELS

Application filed October 15, 1928. Serial No. 312,567.

The principal object of this invention is to provide a scraper for removing excessive foreign matter from the traction wheels of tractors, tanks and the like.

A further object of this invention is to provide a scraper for traction wheels that removes dirt and the like from the same without interfering with the spade lugs on the periphery of the wheels.

A still further object of this invention is to provide a scraper for traction wheels of tractors and the like that may be easily attached and detached from the fenders of tractors without necessitating the services of a skilled mechanic.

A still further object of this invention is to provide a scraper for traction wheels that may be readily released from or placed in an operative position.

A still further object of this invention is to provide a scraper for the traction wheels of tractors and the like that will be automatically thrown out of an operative position in cases where the scraper portion engages an immovable object wedged in the spade lugs or accidentally engages the spade lugs themselves, thereby preventing breakage of the device.

A still further object of this invention is to provide a scraper for traction wheels of a tractor that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of a portion of a tractor wheel and fender with my device secured to the same and in an operative position.

Fig. 2 is a back view of a portion of a tractor wheel and fender with my invention secured thereto ready for use.

Fig. 3 is a side view of my invention detached from a tractor and more fully illustrates its construction.

Fig. 4 is a side view of the scraper blade portion of the device.

Fig. 5 is a front view of my invention detached from the tractor fender.

Fig. 6 is a back view of the invention detached from the fender of a tractor.

The use of spade lugs on the periphery of the traction wheels of tractors are imperative for the obtaining of successful contact with the ground surface over which the wheels are passing.

These spade lugs, however, soon collect much earth and other material between themselves, thereby destroying their efficiency as well as packing the ground over which the wheels move. I have overcome these disadvantages as will be appreciated by those skilled in the art.

I have used the numeral 10 to designate the rear ordinary traction wheel of a tractor or the like, having the drive axle 11. Secured by suitable means on the periphery of the wheel 10 are the two rows of spade lugs 12. It should here be noted that these spade lugs are spaced apart as shown in Fig. 1 and Fig. 2, and the two rows of spade lugs provide a relatively clear path 13 in the center of the rim of the wheel 10. Embracing this wheel is the usual fender 14.

I have used the numeral 15 to designate the base portion of my device, which is secured to the fender 14 by the bolts 16. The lower portion of the base portion 15 is formed into semi-circular claws 17 and 18 respectively. The numeral 19 designates the blade scraper portion of the device, having its forward end sharpened and its rear curved into a collar 20. In the collar 20 and extending at each side therefrom is the shaft 21. When the complete device is assembled the two ends of the shaft 21 are designed to engage and rest in the two claw portions 17 and 18, as shown in Fig. 6, and the collar portion 20 of the scraper blade 19 will be positioned between the two claw portions. By this arrangement the pointed end of the scraper blade may be swung adjacent the path 13 of the wheel 10 and between the two rows of spade lugs 12.

Secured by suitable means on the inner side of the base portion 15, as shown in Fig. 3, is the angle iron 22. Passing between the two claw portions 17 and 18, fulcrumed near its center on the base portion 15, having one of its ends designed to rest on the collar 20 and its other end terminating below the angle iron 22 is the bar 23. Loosely passing through the end of the bar 23 that is below the angle iron 22, and through the lower portion of the angle iron 22 are the two elongated bolts 24. Embracing each of these bolts 24 is a coil spring 25, having its lower end engaging the upper surface of the lower portion of the angle iron 22 and its upper end engaging a washer 26 on each of the bolts 24, thereby yieldingly holding one end of the bar 23 adjacent the lower portion of the angle iron 22 and the other end of the bar 23 against the upper portion of the collar 20. The amount of downward pressure on the collar 20 by the bar 23 may be regulated by adjusting the nuts of the bolts 24.

Secured to the angle iron 22 is the horizontal bracket 27. The numeral 28 designates a coil spring having one end pivotally secured to the bracket 27. Integrally formed on the opposite end of the coil spring 28 is a loop portion 29 capable of engaging the catch member 30 secured by suitable means to the scraper blade 19 as shown in Fig. 3. By such a construction when the loop 29 is engaging the catch member 30 the scraper blade will yieldingly be held against the wheel 10 between the two rows of spade lugs as shown in Fig. 1, thereby scraping and removing any excessive earth or material that is adhering to the traction wheel while the same is rotating.

If a stick, stone or the like becomes caught or so wedged between the spade lugs that the scraper blade cannot remove the same from the wheel, the scraper blade will be forced upwardly, thereby forcing the shaft 21 out of engagement with the claw portions 17 and 18 and preventing serious damage to be done to the device or tractor. The same condition would exist if the scraper blade accidentally engaged one of the spade lugs. The amount of force necessary to thus throw the scraper blade out of an operative position corresponds to the resistance exerted on the collar 20 by the bar 23 and this resistance is regulated by the adjustment of the nuts of the bolts 24.

When the earth over which the tractor is moving is very dry and not caking on the periphery of the traction wheels, the loop member 29 may be removed from engagement with the catch member 21 and the scraper blade 19 will swing by force of gravity to a vertical position and out of operative engagement with the traction wheel.

One of my scraper devices should be used with each drive wheel of the tractor having spade lugs.

When my device is used the efficiency of the spade lugs is maintained and there is no possibility of the wheel becoming so caked with earth that it will pack the loose ground over which the tractor is traveling, thereby making the ground undesirable for agricultural purposes.

Some changes may be made in the construction and arrangement of my improved scraper for traction wheels, without departing from the real spirit and purpose of my invention and it is my intention to cover by my claims any modified forms of structure or use of mechanical equivalents which may be reasonably included within their scope.

I claim:

1. In a scraper for traction wheels, a base member designed to be secured to the fender of a vehicle, claw portions formed on said base member, a shaft designed to normally rest on said claw portions, a scraper member having one end secured to said shaft and its other end capable of swinging to a point adjacent the wheels of said vehicle, a projection on said base member, a bar member fulcrumed near its center on said base member having one end capable of engaging said scraper member and its other end below said projection, a bolt loosely extending through said bar and said projection, a coil spring embracing said bolt having one end engaging said projection and its other end engaging said bolt, and a spring for yieldingly holding said scraper member adjacent the periphery of said wheel and so arranged and positioned that when said shaft is thrown out of engagement with said claw member the tension in said spring for yieldingly holding said scraper adjacent the periphery of said wheel will not be increased.

2. In a scraper for wheels, a base member designed to be secured to the fender of a vehicle, a claw portion formed on said base member, a shaft designed to normally rest and rotate in said claw portion, a scraper member having one end secured to said shaft and its other end capable of swinging to the periphery of the wheel of said vehicle, a projection on said base member, a bar member fulcrumed near its center on said base member having one end engaging said scraper member at said claw portion and its other end extending to a point below said projection, a bolt loosely extending through said bar and said projection, a coil spring embracing said bolt having one end engaging said projection and its other end engaging one end of said bolt, whereby said bar will yieldingly engage said scraper member and resist the removal of said scraper member with said shaft from said claw portion until a predetermined force is longitudinally exerted on said scraper member; the pre-determined force necessary for removing said scraper member and shaft from said claw portion being depended upon the tension of said spring which is adjustable by rotating the nut of said bolt, and a second spring for yieldingly holding said scraper member adjacent the periphery of said wheel.

3. In a scraper for wheels, a base member designed to be secured to the fender of a vehicle, two claw portions formed on said base member, a shaft designed to normally rest and rotate on said claw portions but capable of being moved upwardly and out of said claw portions, a scraper member having one end secured to said shaft and its other end capable of swinging to the periphery of the wheel of said vehicle, a projection on said base member, a bar member fulcrumed near its center on said base member having one end extending between said two claw portions and operatively engaging said shaft and its other end extending to a point below said projection, a spring for holding the said scraper member adjacent the periphery of said wheel, and a spring mechanism for yieldingly holding said bar adjacent said projection, whereby said bar will yieldingly operatively engage said scraper member and resist the removal of said scraper and shaft from said claw portions until said scraper member meets with an unnormal longitudinal force greater than the yielding force of said spring mechanism.

OLIVER T. CROAT.